US006287052B1

(12) United States Patent
Basset et al.

(10) Patent No.: US 6,287,052 B1
(45) Date of Patent: Sep. 11, 2001

(54) MATERIAL AND METHOD FOR LUBRICATING THE METAL SURFACES OF AN EARTH-PRESSURE TUNNEL BORING MACHINE

(75) Inventors: Jean Marc Basset, Sainte-Foy-Lyon; Paul Hofmann, Auberives/Varez; Jean Louis Mansoux, Villeurbanne; Philippe Roman, Chasse-sur-Rhone, all of (FR)

(73) Assignee: Condat S.A. (FR)

( * ) Notice: Subject to any disclaimer, the term of this patent is extended or adjusted under 35 U.S.C. 154(b) by 0 days.

(21) Appl. No.: 08/860,624

(22) PCT Filed: Dec. 15, 1995

(86) PCT No.: PCT/FR95/01675

§ 371 Date: May 28, 1997

§ 102(e) Date: May 28, 1997

(87) PCT Pub. No.: WO96/18802

PCT Pub. Date: Jun. 20, 1996

(30) Foreign Application Priority Data

Dec. 16, 1994 (FR) .................................................. 94 15296

(51) Int. Cl.[7] ....................................................... E21D 9/87
(52) U.S. Cl. ............................................. 405/138; 299/55
(58) Field of Search ..................................... 405/144, 141, 405/138; 299/65, 55, 56, 58; 175/69–71

(56) References Cited

U.S. PATENT DOCUMENTS

| 2,716,018 | * | 8/1955 | Williams ............................. 175/70 X |
| 3,495,665 | * | 2/1970 | Kelly et al. ............................. 175/69 |
| 4,116,011 | * | 9/1978 | Girault ............................. 405/184 X |
| 4,201,678 | * | 5/1980 | Pye et al. ............................. 252/8.5 A |
| 4,212,794 | * | 7/1980 | Grodde et al. ...................... 252/8 XC |
| 4,442,018 | * | 4/1984 | Rand ..................................... 252/307 |
| 4,456,305 | * | 6/1984 | Yoshikawa .......................... 299/56 X |
| 4,457,375 | * | 7/1984 | Cummins ........................... 175/69 X |
| 4,508,183 | * | 4/1985 | Drummond et al. .................. 175/69 |
| 4,517,100 | * | 5/1985 | Nance et al. ....................... 252/8.5 C |
| 4,565,647 | * | 1/1986 | Llenado ............................... 252/354 |
| 4,780,250 | * | 10/1988 | Urfer et al. .......................... 252/547 |
| 4,888,120 | * | 12/1989 | Mueller et al. ................... 252/8.551 |
| 5,180,252 | * | 1/1993 | Tanaka et al. ....................... 405/144 |
| 5,385,206 | * | 1/1995 | Thomas ............................. 175/69 X |
| 5,495,891 | * | 3/1996 | Sydansk ............................. 175/69 X |
| 5,513,712 | * | 5/1996 | Sydansk ................................. 175/69 |

FOREIGN PATENT DOCUMENTS

| 470253 | | 4/1990 | (EP) . |
| 002676500 | * | 11/1992 | (FR) .................................... 405/144 |
| 2099884 | | 12/1982 | (GB) . |
| 2263490 | | 7/1993 | (GB) . |
| WO 9322538 | | 11/1993 | (WO) . |

OTHER PUBLICATIONS

Ohbayashi, Patent Abstracts of Japan, vol. 14, No. 34; Jan. 23, 1990, 1–270911, Oct. 30, 1989.
Kensetsu, Patent Abstracts of Japan, vol. 9, No. 172; Jul. 17, 1985; 60–44423; Mar. 9, 1995.
Fujita, Patent Abstracts of Japan, vol. 13, No. 573, 12/19, 89; 1–239293; Sep. 25, 1989.

* cited by examiner

Primary Examiner—David Bagnell
Assistant Examiner—John Kreck
(74) Attorney, Agent, or Firm—Bierman, Muserlian and Lucas

(57) ABSTRACT

A method of boring a tunnel with a tunnel boring machine comprising injecting into the formation to be bored just before the cutting tools of the boring machine and optionally into the internal discharge chamber of the boring machine, an aqueous foam containing at least one clay, at least one surfactant and at least one gas in proportion to produce a good quality, stable foam with the formation material and discharging the material from the tunnel via the discharge of the boring machine.

5 Claims, 4 Drawing Sheets

MATERIAL AND METHOD FOR LUBRICATING THE METAL SURFACES OF AN EARTH-PRESSURE TUNNEL BORING MACHINE

The present invention concerns the technical field of machines used to bore tunnels, commonly called "tunnel boring machines."

It is known that these machines are capable of boring into subterranean formations, a tunnel whose diameter corresponds directly to the final diameter of the work to be performed, or essentially so. It naturally involves extremely powerful and complex machines whose operating constraints and requirements are in proportion to their design.

Among the constraints, we shall consider here in particular the problems associated with the attack of the underground formation by the boring tools. This naturally causes substantial wear on these tools, and it is understood that this is related to the hardness of the rock. Another related problem resides in the evacuation of the cuttings and the debris.

There is also a substantial wearing of the components used for evacuation of the debris, especially if it involves an endless screw or Archimedes screw, either on the screw or on its metal envelope, and often also on the tunnel machine skirt.

It will be recalled that there are two main types of tunnel boring machines: "bedrock" tunnel boring machines designed to attack terrains with a good deal of rock and the like, and "confinement" tunnel boring machines designed to operate on soil of ordinary content (alluvial soil, sand, clays) or wetlands.

By the nature of the soil tunneled, the latter boring machines are less severely confronted with wear problems. On the other hand, they can operate in an easily worked or liquid (water bearing) environment, and they contain a system which ensures imperviousness behind the boring machine head.

The acuteness of the wear problems will also be recalled. The boring machines are actually machines whose wearing parts are by definition very hard to access, whether it involves the screw, the tools and cutting wheels for boring, the front surface of the tunnel boring machine, or its lateral skirt. Moreover, when a wearing phenomenon makes it necessary to replace a part, it is necessary to stop the machine, and sometimes to move it back and partially dismantle it. These downtimes translate into enormous financial losses and any gain in matters of prolonging the service life of a part is immediately and very keenly felt.

prior art discloses injecting water or a watery fluid into the head of the tunnel boring machine. By known appropriate devices, this fluid is brought to the cutting tools and at this level is brought into contact with the formation to be bored.

This fluid fulfills a most classical dual function, which is to lubricate the contact zone between the cutting tool and the rock, on the one hand, and on the other hand to permit an easier evacuation of the cuttings in the form of a slurry loaded with debris, and to reduce the formation of dust.

However, this is only a palliative measure and the industry in question for many years has been confronted more frequently with increasingly more acute problems connected with the performance of the machines and the requirements of the users.

Foams have likewise been used comprised only of water and surface-active agent(s) (and a gas such as air) in the case of confinement boring machines. The purpose of the water foam is this case to fluidize the excavated material, to improve the permeability of the soil (which is possible precisely by virtue of the nature of the terrain encountered by this type of boring machine) and thus to reduce the torque applied to the machine.

This technique has been tried in rock tunneling machines and is ineffective, i.e., it does not provide substantial progress.

The use of lubricating systems has likewise been tried, also without significant results.

According to the invention, the problems described above are improved to a surprising degree.

According to the invention, into the head of the tunnel boring machine, not a water fluid or a water foam or lubricant, but a watery foam composition heavily loaded with clay(s) is injected.

This composition is injected in the form of a foam formed either upstream of the head of the boring machine, or in situ.

This results in an altogether unexpected reduction in wear as well as significantly easier extraction of the cuttings.

The clay foam composition also makes it possible to reduce greatly the volume of water necessary, which bears on the enormous volumes and thus has great impact on respecting the environment and, moreover, the processing of the excavated material in view of respecting the environment is easier, some excavated material not even needing to be treated.

Without wanting to be limited by any theory, it has been noted that the reduction of wear seems to derive essentially from the occurrence of coating of the rock fragments by a layer of composition according to the invention.

Thus, wear is reduced not only by lubrication or fluidization of the surrounding medium, but essentially by a new function which reduces the abrasive nature of the rock itself providing a radical solution to the wear problems.

Other features and advantages of the invention will be better understood upon reading the description following and referring to the enclosed drawing, in which.

In this design identical reference symbols have identical meaning as follows.

Figure 1:
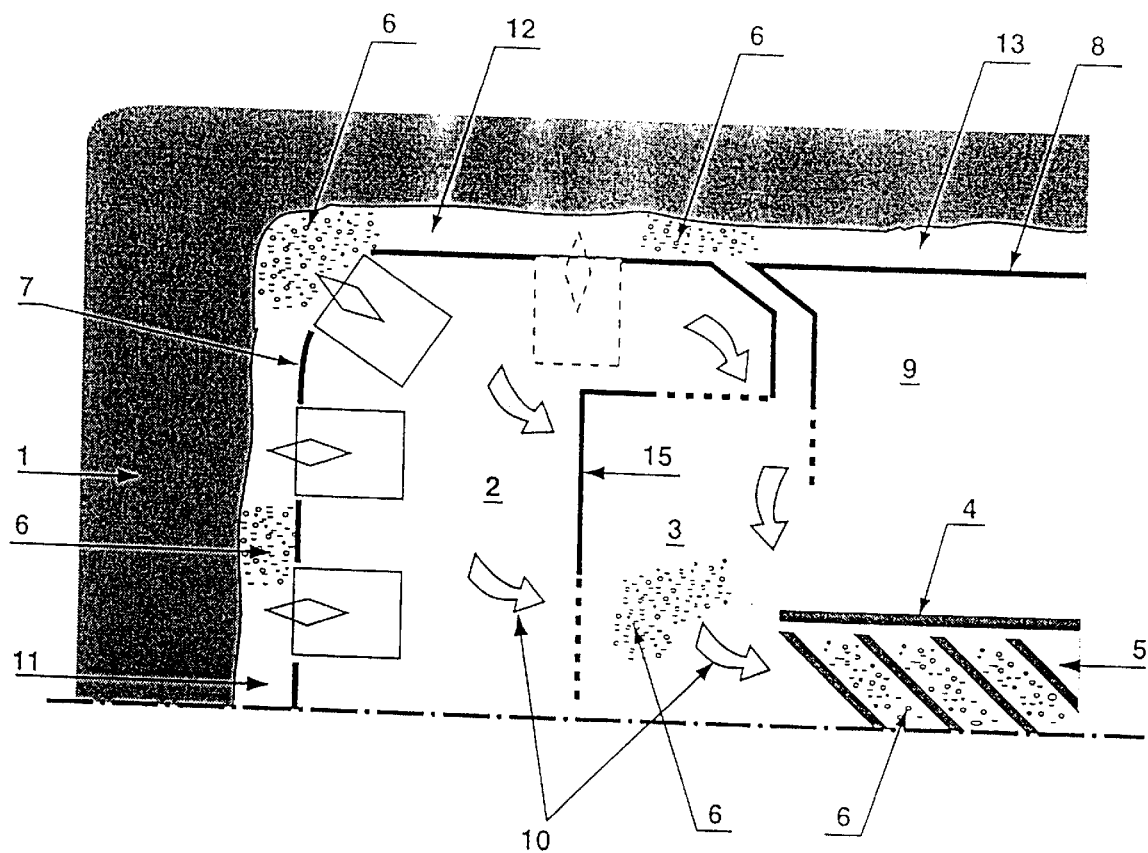
FIG. 1 represents schematically and in transverse cross section a tunnel boring machine in operation.
Figure 2:
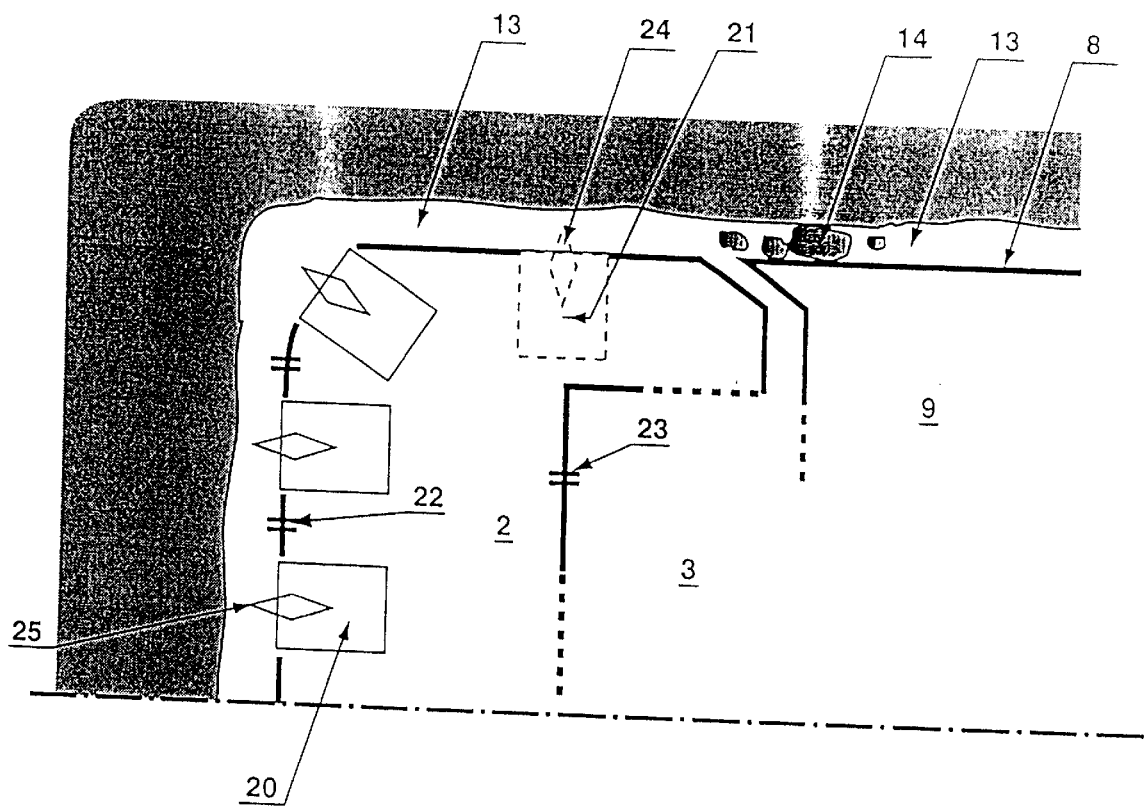
FIG. 2 represents specific details of the boring machine according to FIG. 1.

1. underground formation.
2. rotary head of boring machine.
3. boring machine chamber.
4, 5. excavated material extraction system: 5 endless screw, 4 tunnel (or casing) of the screw).
6. excavated material.
7. front face of the boring machine head.
8. boring machine skirt.
9. body (fixed) of the boring machine.
10. general circulation of the excavated material.
11. cutting space.
12. overcut space.
13. skirt—wall interspace.
14. excavated material fragment.
15. back face of the head.
20. cutting wheel and its support.

21. overcut wheel and its support.
22. injection point in the front face.
23. injection point in the back face.
24. overcut wheel.
25. cutting wheel.
30. tube (of concrete).
31. formation—tube contact wall.
32. thrust jack.
40. receptacle.
41. wear plate.
42. test material.
43. shaft.

As will be recalled briefly here, a tunnel boring machine designed to bore a tunnel in a formation (1) comprises essentially a cylindrical body (9) including the appropriate machinery, and a head (2) mounted pivoting on the front of the body. This head carries the cutting tools which are comprised of cutting wheels (25) and supports (20) and where applicable, "overcut" cutting wheels (24) and supports.

The cutting tools (and where applicable those of overcut) attack the formation (1) by their own rotation associated with the rotation of the head (2). Within the scope of the classical method fluid, generally watery, is injected into the cutting space (11) and into the inside chamber (3) as well as where applicable into the overcut space (12) to limit the wear on the parts and facilitate the extraction of the excavated material toward the rear of the boring machine.

This extraction is classically done by systems inside the body of the boring machine, generally a belt or endless screw. By way of a non-limiting [example], there is represented in FIG. 1 an endless screw (5) and its tunnel or envelope (4).

Still in the classical way, the excavated materials mixed into the watery fluid are conducted through the head (2) by conduits not represented, and are brought together in the inside chamber (3) whence they are extracted (6) toward the rear (4, 5). Naturally, a part of these excavated materials will circulate more or less easily around the head (space 12) and still less easily around the fixed skirt (8) of the boring machine in the interspace (13).

The specialist in the field knows that the problems of wear and of blockage or jamming are the following:

Wear on the cutting tools situated on the front face (7).
Wear on the overcut tools (24).
Wear on the skirt (8) and even where applicable occurrences of jamming by the blocks (14) which could not be sufficiently disintegrated.
Wear on the front and side faces.
Wear and, where applicable, blockage or jamming at the level of the extraction system, especially when the latter consists of a screw and its envelope (4, 5).

Within prior art, heavy slurries are used comprising water, clay and/or polymers. These materials give suitable results but it would appear very desirable to improve them in order to lengthen the time between maintenance operations which would be of considerable advantage.

Moreover, the use of heavy slurries of prior art requires extremely cumbersome preparation stations (which becomes prohibitive in a city environment, for example) and costly. The slurry requires enormous amounts of water, which creates problems of an ecological nature, and is a liquid material, which poses a serious problem regarding protection of the environment at the level of discharges. Finally, these slurries loaded with excavated material are difficult to remove from the extraction systems, for example a rolling conveyer, with the difficulties aggravated by any slope.

The purpose of the invention is to propose a technique which greatly reduces the wear on the parts and this greatly increases the time between maintenance operations, and makes it possible to eliminate the constraints on using heavy slurries.

According to the invention, any clay is used capable under the conditions described here, of forming a coating of debris and of the endangered parts, and to adhere to it without the ill-fated "sluicing" phenomenon.

A large number of clays exist and the specialist in the field will know how to use the most interesting ones by doing simple tests like the one which will be described below, all readily performed. A clay is preferably selected whose source is as close to the work site as possible, for the obvious reasons of transporting expense.

The foam will be formed with the aid of a known foaming agent or their mixtures.

One will preferably choose, for the convenience of the mixing operations, a liquid foaming agent or surfactant (or a liquid mixture).

A representative compound of the invention is comprised of 34 liters of foam precursor watery liquid to 66 liters of clay.

For the same pumped volume of 100 liters, the classical prior art uses 90 liters of water to 10 liters of bentonite.

APPLICATION EXAMPLE

Test Procedure

Figure 4:
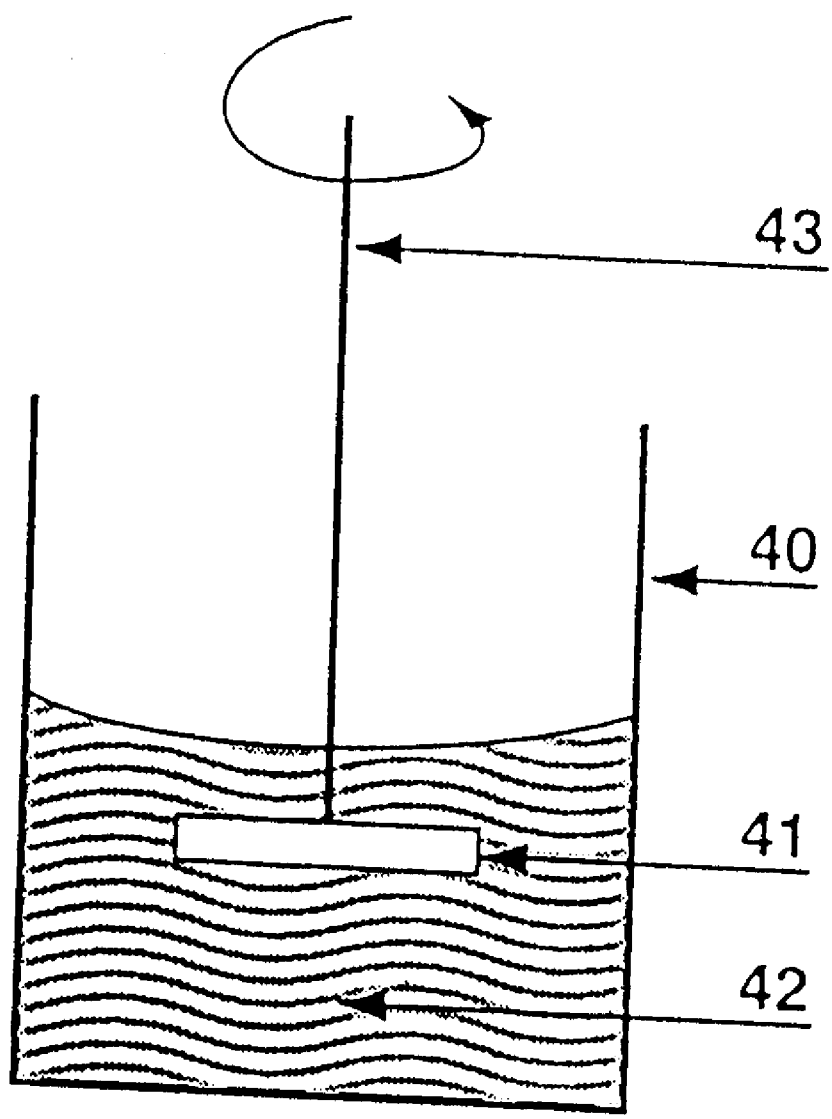
FIG. 4 represents the test cell developed to evaluate the effectiveness of the invention compared to prior art.

The test cell is represented in FIG. 4. This simple cell will enable the specialist in the field to select quickly by routine laboratory tests the clay(s) and the surfactant(s) (and classical additives) to use, as well as the proportions of gas such as compressed air, to adapt the present description to each particular case; it will be understood that it is impossible to present here an example of the innumerable combinations of formations to excavate and type of boring machine, cutting tools and cutting tool placement. On the other hand, the teaching of the invention will be applicable, generally, due to the present example, with only the adaptations within the purview of the specialist in the field, to make a foam suitable to remain sufficiently stable and able to transport the excavated material.

The cell includes a receptacle 40 in which a steel wear plate (41) immersed in the material to be tested (42) is turned.

This test procedure, for example at 100 rpm in a receptacle of 10 liters, is particularly representative of the wear of the extraction screw which represents the most serious problem.

At the head of the tunnel boring machine a clay foam formed of:

clay: 66 liters.

foaming watery mixture (water and additives): 34 liters. is prepared.

Among the additives, the foaming agent is a mixture of appropriate, commercially available surface active agents yielding a stable foam of good quality with good suspension properties.

The test performed (as described above in relation to FIG. 4) would consist of comparing the wear on the metal surfaces engendered by gneiss. The results are the following:

on gneiss without additive: wear level: 100.
on gneiss+water: wear level: 20
on gneiss+water+bentonite+clay: wear level: 29 on gneiss+above clay foam mixture: wear level: 1 to 2.

These tests were confirmed on a sample of clay foam after passage through the cutting head of a tunnel boring machine.

The foam is injected into the tunnel boring machine in the classical way, by known turning joints, which thus does not require modification of the machine.

The foam according to the invention may be injected by the front face only, but preferably double injection into the front face and into the back face to facilitate extraction will be carried out.

The test reveals an extraordinarily low wear level which differs by an order of magnitude.

Without wishing to be limited by any theory, the applicant favors the hypothesis that coating by foam of abrasive particles, cutting tools and surfaces of the machine and of the formation occurs with the formation of interfaces of good adhesion (which are not destroyed or reformed) and in such a way that, to an unexpected degree, reduction of the particular friction coefficients takes place.

Figure 3:
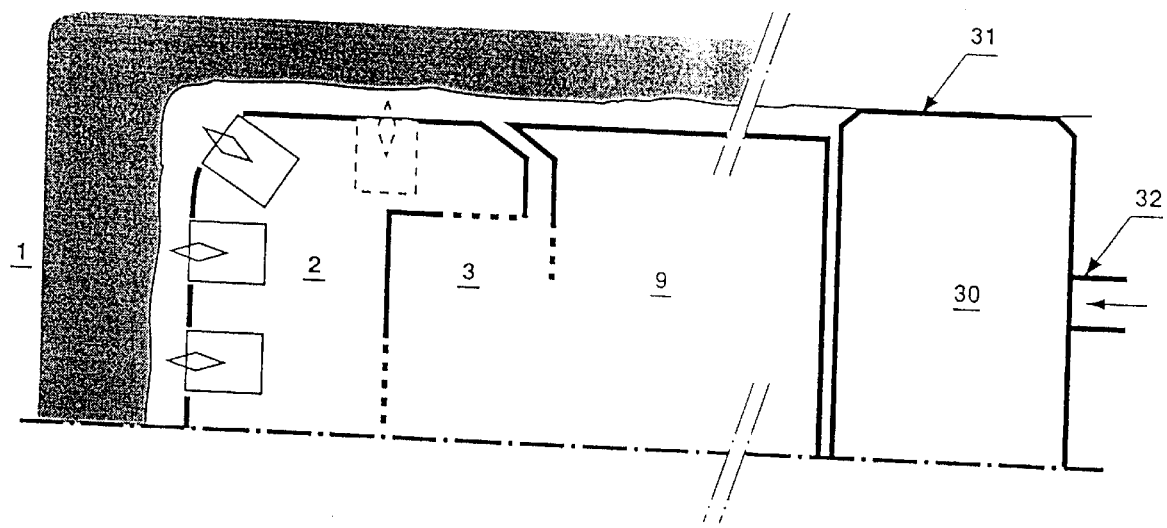
FIG. 3 represents schematically the jacks and concrete "tubes" system used simultaneously to advance the boring machine and shore up the wall of the tunnel behind the machine.

The invention likewise presents great interest in the use of the "thrust tube." These systems, schematically represented in FIG. 3, are tubes or rings of concrete or analogous material (30) joined to the back of the tunnel boring machine (9) and thrust toward the front by jacks (32). Their function is dual: transmission of the thrust and displacement to the tunnel boring machine, and consolidation or shoring-up of the tunnel. Their peripheral surface is thus essentially in contact with the tunnel wall (31).

It has been noted that for the reasons indicated above sliding was greatly facilitated by the injection of the clay foam according to the invention.

What is claimed is:

1. A method of boring a tunnel with a tunnel boring machine comprising injecting just before the cutting tools of the rotating head of the boring machine and the formation to be bored, an aqueous foam containing at least one clay, at least one surfactant and at least one gas in proportion to produce a good quality, stable foam with the formation material and discharging the material from the tunnel via the discharge of the boring machine.

2. The method of claim 1 wherein an already formed foam is injected from the internal discharge chamber of the boring machine.

3. The method of claim 1 wherein the gas is air.

4. The method of claim 1 wherein the gas is compressed air or compressed nitrogen.

5. The method of claim 1 wherein the foam is injected at the lateral surfaces of the thrust tubes of the boring machine.

* * * * *